US008688368B2

(12) United States Patent
Ofek et al.

(10) Patent No.: US 8,688,368 B2
(45) Date of Patent: Apr. 1, 2014

(54) IMAGE-BASED LOCALIZATION FOR ADDRESSES

(75) Inventors: Eyal Ofek, Redmond, WA (US); Pragyana K. Mishra, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1865 days.

(21) Appl. No.: 11/784,863

(22) Filed: Apr. 9, 2007

(65) Prior Publication Data

US 2008/0249702 A1 Oct. 9, 2008

(51) Int. Cl.
*G01C 21/26* (2006.01)
(52) U.S. Cl.
USPC .............................................. 701/409; 702/2
(58) Field of Classification Search
USPC ................. 701/201, 400, 408–409, 426, 438, 701/445–447; 382/103, 113, 173, 180, 191, 382/190, 100, 220; 702/2, 5, 7, 15, 16
See application file for complete search history.

(56) References Cited

U.S. PATENT DOCUMENTS

| | | | |
|---|---|---|---|
| 6,631,326 B1 | 10/2003 | Howard et al. | |
| 7,155,336 B2 * | 12/2006 | Dorfman et al. | 701/200 |
| 7,720,436 B2 * | 5/2010 | Hamynen et al. | 455/13.1 |
| 7,801,897 B2 * | 9/2010 | Egnor | 707/741 |
| 2001/0048364 A1 | 12/2001 | Kalthoff et al. | |
| 2002/0002467 A1 | 1/2002 | Ho | |
| 2003/0061211 A1 | 3/2003 | Shultz et al. | |
| 2004/0023666 A1 | 2/2004 | Moon et al. | |
| 2004/0138817 A1 * | 7/2004 | Zoken et al. | 702/5 |
| 2004/0225635 A1 | 11/2004 | Toyama et al. | |
| 2005/0034074 A1 | 2/2005 | Munson et al. | |

FOREIGN PATENT DOCUMENTS

WO WO0101077 A1 1/2001

OTHER PUBLICATIONS

Han, et al., "Construction of Multimedia Map Database Using Urban City Images", Date: 2001, http://ieeexplore.ieee.org/iel5/8766/27769/01237930.pdf?isNumber=.
Robertson, et al., "An Image-Based System for Urban Navigation", http://mi.eng.cam.ac.uk/reports/svr-ftp/cipolla_bmvc04.pdf.
Se, et al., "Global Localization using Distinctive Visual Features", Date: 2002, http://www.vision.caltech.edu/html-files/EE148-2005/uploads/SeLittle02Global.pdf.

* cited by examiner

*Primary Examiner* — Dalena Tran
(74) *Attorney, Agent, or Firm* — Steve Spellman; Jim Ross; Micky Minhas

(57) ABSTRACT

The present localization system determines a precise location for an address based on images. Some implementations identify the precise location using one image. Other implementations identify the precise location using multiple images. While still other implementations identify the precise location by interpolation, which uses precise locations of addresses nearby that were previously localized using one or more images. The images used in determining the precise locations have a visual feature associated with the address appearing in the image.

20 Claims, 5 Drawing Sheets

IMAGE-BASED LOCALIZATION FOR ADDRESSES

BACKGROUND

Geocoding assigns geographic codes or coordinates (e.g., longitude and latitude) to map or locate features, such as street addresses. Once the mapped features are assigned geographic coordinates, the features may be mapped and entered into a geographic information system (GIS). Mapping applications may utilize the GIS to obtain the geographic coordinates and display a symbol (e.g., star, push-pin) on a computer-generated map that corresponds to a location for the map feature.

The placement of the symbol on the computer-generated map is only as accurate as the geographic codes or coordinates assigned by a geocoding technique (i.e., localization technique). Current localization techniques employ address interpolation to determine coordinates for street addresses within a street segment. Address interpolation assumes that addresses along the street segment are evenly distributed. When addresses are not evenly distributed, incorrect coordinates are assigned to the addresses.

Current localization techniques that utilize address interpolation also fail in other situations. One situation where current localization techniques fail occurs when an address is located within a larger building, such as a mall or a multi-stored complex. Because the localization techniques produce a point for each address, an address is not accurately handled if the address is distributed along the length of a segment, such as an address for a shopping mall. For example, the symbol for a store at one end of the shopping mall may be located on the computer-generated map at the opposite end of the shopping mall. Another situation where current localization techniques fail occurs when addresses are on multi-level streets.

As one can see, current localization techniques that utilize address interpolation are neither ideal nor precise.

SUMMARY

Described herein are various technologies and techniques for localizing addresses using images. Some implementations identify a location for an address based on one image. Other implementations identify the location based on multiple images. While still other implementations identify the location for the address by interpolation, which uses addresses nearby that were previously localized using one or more images.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Many of the attendant advantages of the present localization system and technique will become more readily appreciated as the same becomes better understood with reference to the following detailed description. A brief description of each drawing is described below.

DETAILED DESCRIPTION

The following discussion first describes an example technique for obtaining images used in determining precise locations for addresses. Next, the discussion focuses on localization components suitable for implementing a localization system that determines precise locations for addresses. The discussion then describes an example process suitable for determining precise locations for addresses using images and an example process that utilizes the precise locations in a mapping application. Lastly, the discussion describes one possible configuration for a computing device that may implement one or more of the localization components.

However, before describing the above items, it is important to note that various embodiments are described fully below with reference to the accompanying drawings, which form a part hereof, and which show specific implementations for practicing various embodiments. Other embodiments may be implemented in many different forms and should not be construed as limited to the embodiments set forth herein; rather, these embodiments are provided so that this disclosure will be thorough and complete. Embodiments may take the form of a hardware implementation, a software implementation executable by a computing device, or an implementation combining software and hardware aspects. The following detailed description is, therefore, not to be taken in a limiting sense.

In various embodiments, the logical operations may be implemented (1) as a sequence of computer implemented steps running on a computing device and/or (2) as interconnected machine modules (i.e., components) within the computing device. The implementation is a matter of choice dependent on the performance requirements of the computing device implementing the embodiment. Accordingly, the logical operations making up the embodiments described herein are referred to alternatively as operations, steps, or modules.

Example Technique for Obtaining Images

Figure 1:
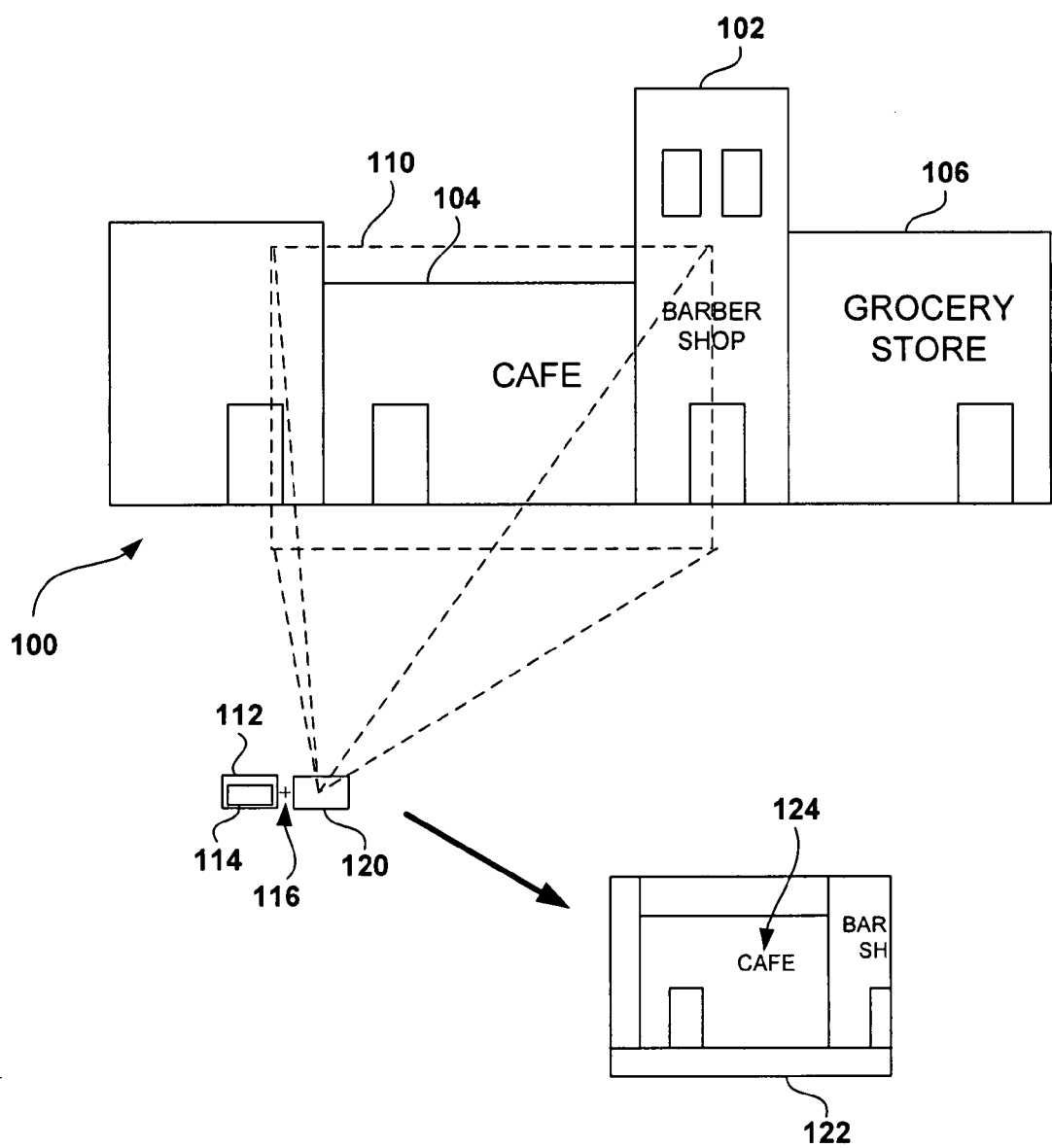
FIG. 1 illustrates one example technique for obtaining images used in determining precise locations for addresses.

FIG. 1 graphically illustrates one example technique for obtaining images used in determining precise locations of addresses. A city street 100 is shown on which several businesses (e.g., barber shop 102, café 104, and grocery store 106) are located. Each business has a street-level view (e.g., street-level view of café 110), which is a view as seen from an observer who is passing by the business at street-level. An image-capturing device 120 captures an image (e.g., image 122) of the street-level view 110. The image 122 includes one or more street-level features 124, such as facades of buildings, store logos, store signs (e.g., "CAFÉ"), house number signs, and other features that distinguish the business from other businesses nearby.

In addition, another device 112 obtains positional data 114 associated with image capturing device 120. The positional data 114 includes geographic coordinates related to image capturing device 120 when image 122 is captured. The positional data 114 and image 122 are associated with each other. The association may be achieved manually by writing the positional data and the picture number, may be achieved by recording the positional data and picture number in an electronic device, or may be achieved using other techniques whereby the image and positional data are associated. Multiple images may be taken of the same business with the same or different image-capturing device. Typically, each of the multiple images is taken at a slightly different angle and/or position so that the street-level view is a little different in each image. Each image and associated positional data is recorded.

Image capturing device 120 may utilize any well-known image capturing technology found in digital camera, digital video camera, and other capturing devices. For example, the images may be captured by a person walking on the street who is taking pictures with a digital camera, may be captured by a camera positioned on or in a vehicle that is driving down the city street, or may be captured using other techniques. The positional data may be obtained using a global positioning system (GPS) device that is carried by a person, mounted on or in a vehicle, or may be obtained by any other device configured to obtain positional data. For example, an automobile may be equipped with a GPS device. When a picture is taken, the GPS readings are recorded and associated with the picture (i.e., captured image). The images and the respective positional data may be stored in an image database that is accessible to a localization system. While FIG. 1 illustrates one example technique for obtaining images and respective positional data, the present localization system may obtain this information in various other ways without departing from the scope of the claimed invention.

Components for Implementing a Localization System

Figure 2:
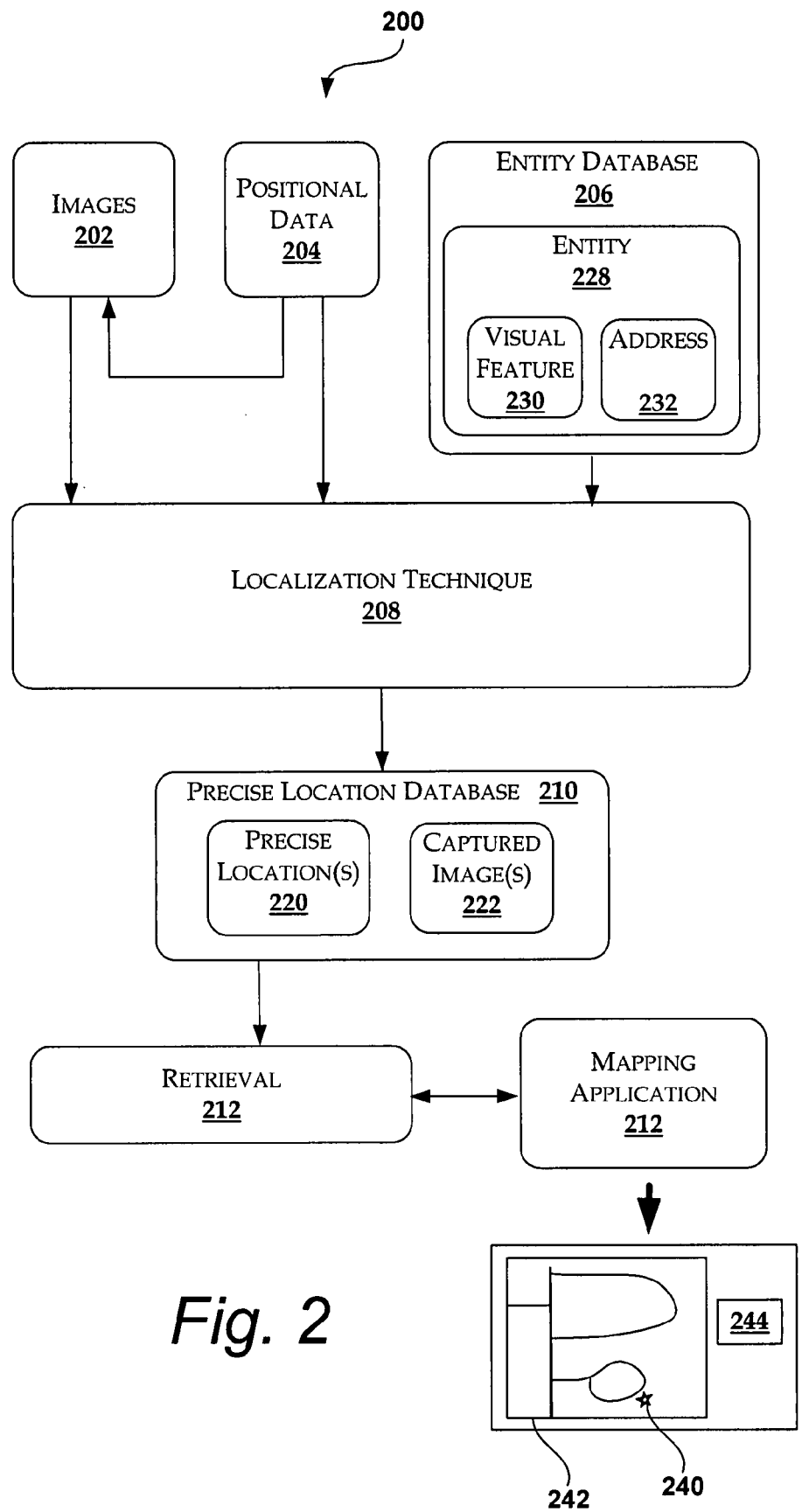
FIG. 2 illustrates one example configuration of localization components suitable for implementing a localization system that determines precise locations for addresses.
Figure 3:
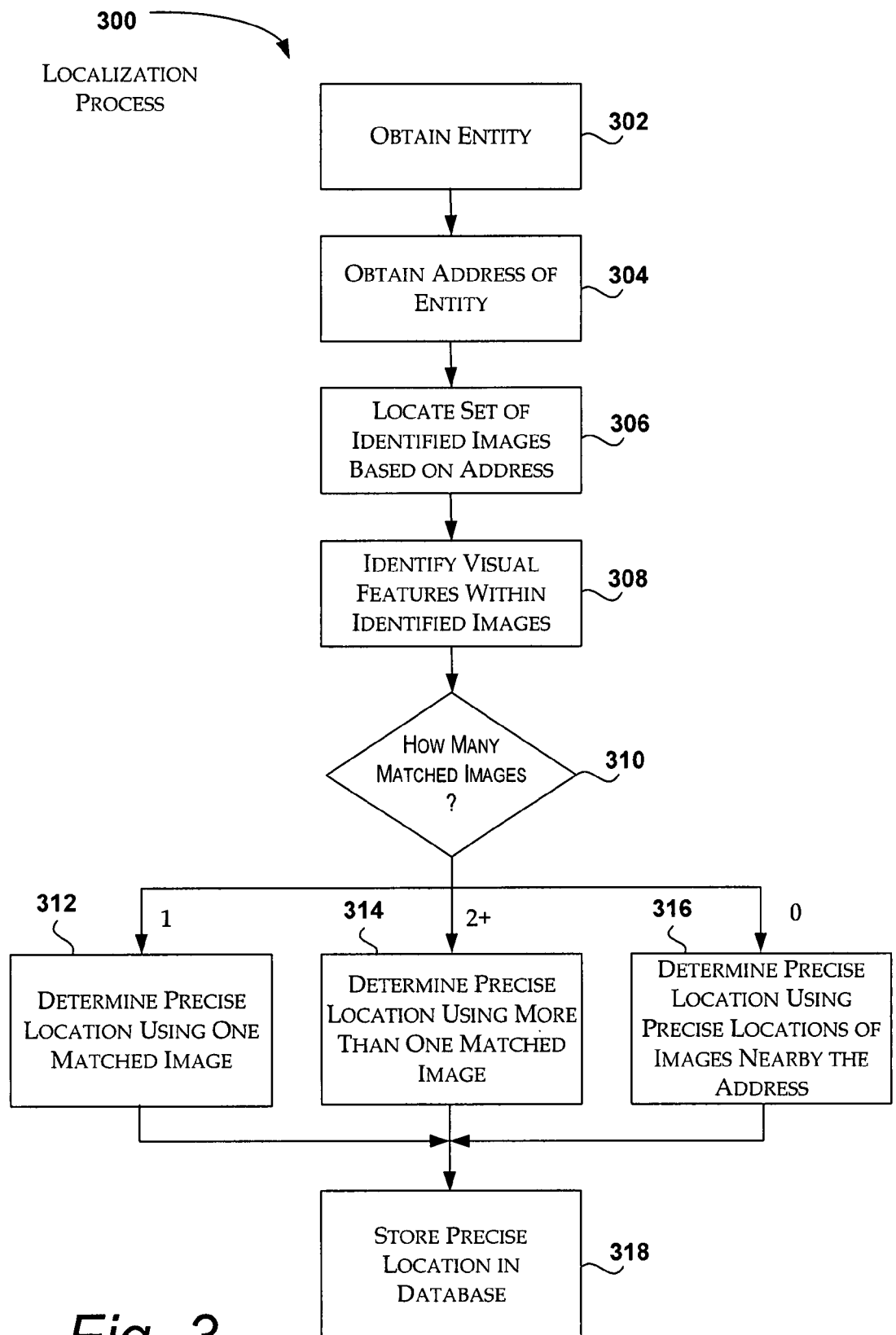
FIG. 3 is a flow diagram illustrating one example of a process for determining a precise location for an address using images.
Figure 4:
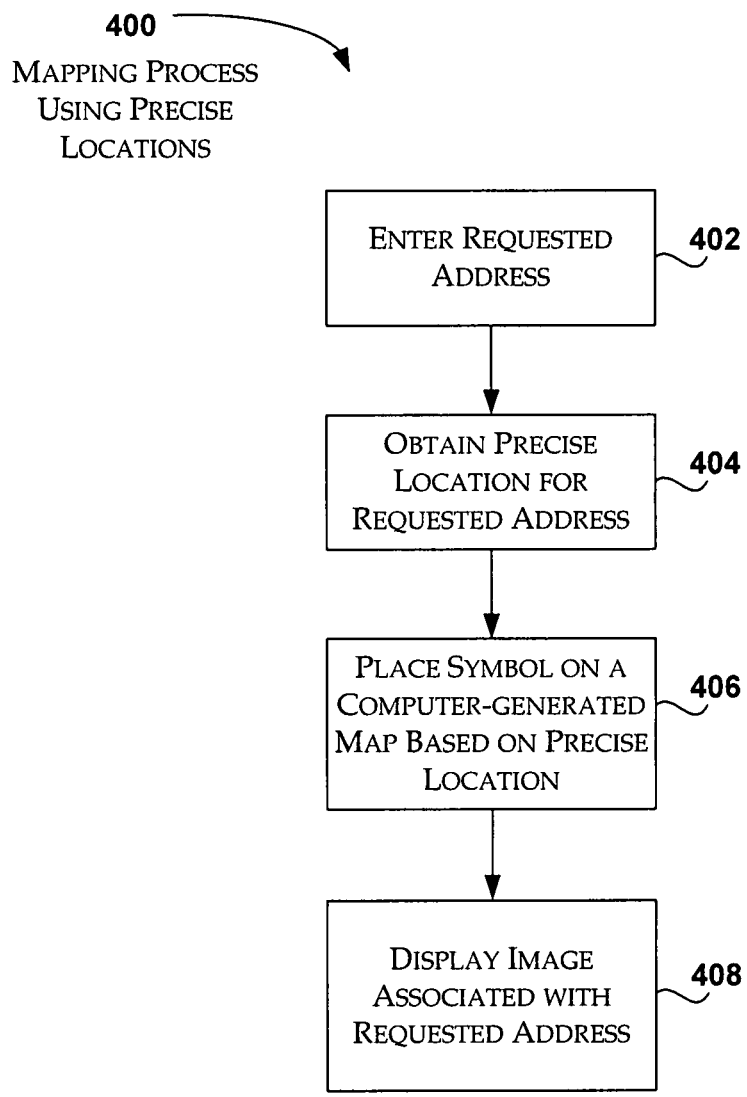
FIG. 4 is a flow diagram illustrating one example of a process that utilizing the precise locations determined by the process shown in FIG. 3.

FIG. 2 illustrates one example configuration of localization components suitable for implementing a localization system. FIGS. 3 and 4 illustrate example processing performed by one or more of these components. In overview, the localization system 200 includes images 202, positional data 204, an entity database 206, and a localization technique 208.

Images 202 include a set of captured images that covers a specified area. The images 202 may have been captured as illustrated in FIG. 1 or by another technique. The area covered by the set of captured images may be a residential neighborhood, a business district, or any other area having structures that are located within proximity to each other. In addition, the area may be of any size. For example, the area may be a residential block, a strip mall, a city, a county, a state, or other sized area. In contrast with satellite images that provide a "roof top" view, the set of captured images provide a "street-level" view from a user's perspective as if the user is driving or walking in the specified area. Therefore, the set of captured images typically includes facades of buildings, store logos, store signs, house number signs, and other street-level features.

The positional data 204 identifies a location. The positional data may include a longitude and latitude reading that identifies the location. The positional data 204 may be obtained using well-known devices, such as a Global Positioning System (GPS) device. Each image in the set of captured images is associated with positional data that indicates the location where the image was captured. Positional data 204 may be associated with each captured image manually or electronically.

The entity database 206 includes one or more entities (e.g., entity 228). Each entity is associated with at least one visual feature (e.g., visual feature 230), such as a landmark, a logo, a previously known image, or other visual information that identifies a specific entity. For example, the visual features 230 in database may be logos obtained from a yellow page book for a city, multi-city area, region, state, or other sized area. Each logo may be associated with a business located at one or more specified addresses identified in the yellow page book. The entity database 206 also includes an address (e.g., address 232) associated with each entity. The addresses in the entity database 206 cover a predetermined area, which may be one of various sizes. The predetermined area covered by the addresses may correspond to a specified geographic area covered by the set of captured images or may include less area than the set of captured images. If the predetermined area is larger than the area covered by the set of captured images, the localization technique 208 may use interpolation to obtain precise locations for the addresses associated with visual features that do not appear in any of the images 202. However, as will be explained in more detail below, the interpolation is based on precise locations calculated in accordance with the present localization technique.

The localization technique 208 inputs information from the entity database 206, images 202, and positional data. A source for the images and the positional data may be the same if the images 202 have already been associated with their corresponding positional data 204. The localization technique 208 attempts to match a visual feature identified in the entity database 206 for one entity to content within one or more of the captured images. FIG. 3, described later, illustrates an example process suitable for implementing the localization technique 208.

The localization system may also include a precise location database 210. Database 210 stores the outcome (e.g., precise locations) for addresses processed by the localization technique. In addition, precise location database 210 may store one or more captured images associated with an address in the entity database 206. Because one or more images are associated with an address, the precise location database 210 can be structured in a manner that facilitates efficient retrieval of images relevant to a requested address. Content of the precise location database 210 may be used by mapping applications, may be used to update geographic information systems (GIS) data, or may be used by other processes in which precise locations are desired.

The localization system may also include a retrieval component 212. The retrieval component accesses the precise location database 210 and obtains a precise location for an address, such as an address entered by a user via a mapping application 214. The mapping application uses the precise location to determine a placement for a symbol 240 on a computer-generated map 242 that represents a vicinity around the address. In addition, the mapping application may display an image 244 associated with the requested address. The displayed image illustrates a street-level view for the address. This allows a user to become familiar with the street-level view of the requested address, which may ultimately help the user locate the address when the user travels to the requested address.

Even though FIG. 2 illustrates storing the precise locations in a database for retrieval, one will note that the precise locations could be determined in real-time in response to a user query. FIG. 2 illustrates one possible arrangement of the localization components suitable for implementing a localization system. One skilled in the art will appreciate that any one of the components may perform processing steps performed by one of the other components. In addition, additional components may be added to support the described processing steps. Thus, there may be numerous configurations for the localization components.

Example Processes Suitable for Implementing the Localization Components

The following flow diagrams, FIGS. 3 and 4, provide example processes that may be used to implement the processing performed by some of the localization components shown in FIG. 2. The order of operations in these flow diagrams may be different from described and may include additional processing that is not shown. In addition, not all of the processing shown in the flow diagrams needs to be performed to implement one embodiment of the localization system.

FIG. 3 is a flow diagram illustrating one example of a localization process 300 for determining precise locations using images. Process 300 is suitable for use in the processing performed by the localization technique 208 shown in FIG. 2. Process 300 is performed for one or more of the entities identified in the entity database. The objective of process 300 is to determine a precise location for an entity. Process 300 achieves this objective by using images to determine the precise location for an address associated with the entity. Process 300 begins at block 302 where an entity is obtained. As discussed earlier, the entity is associated with a visual feature and at least one address. The entity may be obtained from the entity database. In another embodiment, the entity and associated information (e.g., address, distinct feature) may be supplied directly to process 300 without being retrieved from the entity database. In this embodiment, process 300 may be performed in real-time to determine a precise location in response to the supplied information.

At block 304, one of the addresses associated with the entity is obtained. One will note that an entity may be a chain store located at several addresses. In this situation, each store is associated with the same distinct feature (e.g., logo), but the addresses are different. Process 300 is performed for each address.

At block 306, the address is used to identify a set of captured images out of the images. Each image in the set of captured images has positional data indicating a location near the address. One will note that by cataloging the images by their associated positional data, images having positional data indicating a location near the address of the entity may be easily identified. The set of images captured near the address are referred to as identified image(s).

At block 308, the identified images are analyzed to identify whether the visual feature appears in any of the identified images. An identified image that contains the visual feature is referred to as a matched image. A pattern matching technique may be applied to the identified images to determine if the visual feature appears in any of the identified images. The pattern matching technique may be performed manually, electronically, or using a combination of both. Manual pattern matching may be performed by visually comparing the visual feature with the relevant identified images to identify images having the visual feature. Electronic pattern matching may be performed using any well-known feature mapping techniques or other technique that can identify a visual feature within an image.

At decision block 310, the number of matched image(s) is used to determine the manner in which a precise location for the address is calculated. If there is one matched image, processing continues at block 312. If there is more than one matched image, processing continues at block 314. If there are no matched images, processing continues at block 316.

At block 312, the positional data associated with the one matched image, along with the matched image, is used to determine a precise location for the selected entity. A distance from where the matched image was taken to the actual building associated with the entity may be calculated to obtain the precise location. As discussed earlier, the positional data provides coordinates of a location where the image was taken.

At block 314, the positional data associated with each of the matched images, along with the matched images, are used to determine a precise location for the selected entity. In overview, a ray may be extended in a view direction of one matched image until the ray intersects with another ray extended in a view direction of another matched image. Two or more rays may be used. The location at which the rays meet determines the precise location. In one embodiment, three or more matched images may be triangulated to obtain the precise location. Triangulation may be performed using well-known techniques used in surveying, navigation, and other fields.

At block 316, positional data associated with captured images near the address of the selected entity are used to interpolate a precise location for the address. In contrast with traditional interpolation techniques, the interpolation technique employed by the present localization system utilizes precise locations instead of performing approximations based on assumptions. The precise locations calculated using process 300 for nearby addresses are used to interpolate a "precise" location for the entity that does not have an image in which the associated distinct features is identified. Because precise locations of nearby addresses are used, the interpolated precise location is more accurate than traditional interpolation techniques. Dead reckoning may be used in interpolating the precise location. Dead reckoning is the process of estimating a current position based on a previously determined position and advancing that position based on known information. For example, dead reckoning may utilize pixel displacements between successive images to interpolate the precise location.

At block 318, the precise location may be optionally stored in a precise location database. As discussed above, in one embodiment, precise locations are preprocessed and are stored in the precise location database. In another embodiment, the precise locations are processed in real-time without being stored in a database. In another embodiment, a combination of pre-processing and real-time processing may be implemented. For example, as addresses are requested for mapping, precise locations are calculated and stored in the precise location database. If the same address is later requested for mapping, the precise location may be retrieved from the precise location database.

FIG. 4 is a flow diagram illustrating one example of a process for utilizing the precise locations determined with the process shown in FIG. 3. The example process is for a mapping application that generates computer-generated maps. One will note that other example processes may utilize the precise location to implement the corresponding application. In one embodiment, process 400 accesses the precise locations from a database. In another embodiment, process 400 accesses the precise locations in real-time from process 300. Process 400 begins at block 402.

At block 402, a requested address is entered. The requested address may be entered via a mapping application. At block 404, a precise location associated with the requested address is obtained. As mentioned above, the precise location may be obtained from a database or may be obtained in real-time. At block 406, a symbol is placed on a computer-generated map based on the precise location. At optional block 408, an image associated with the requested address may be displayed. The image may show a street-level view of an entity associated with the requested address.

One Embodiment of a Device that Implements the Localization Technique

Figure 5:
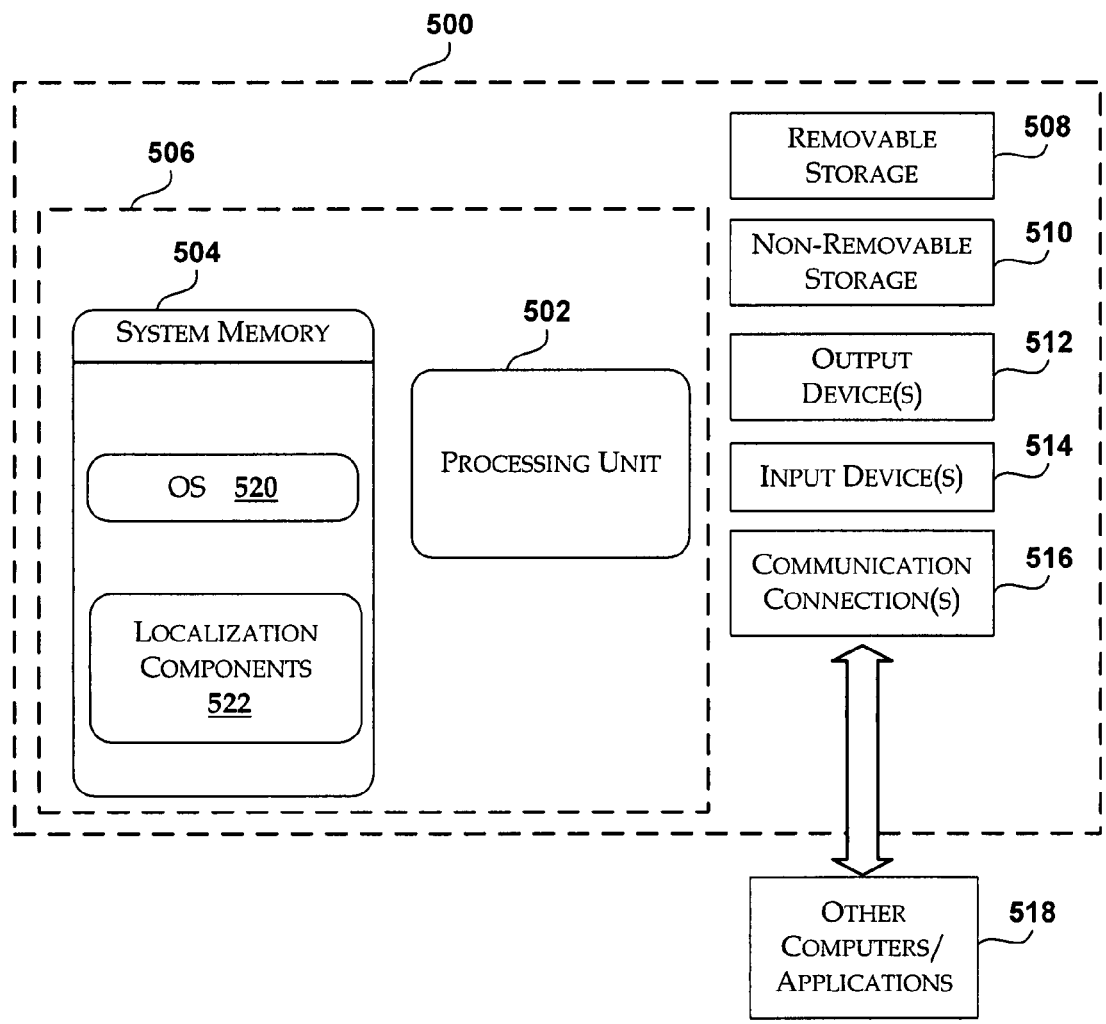
FIG. 5 is a functional block diagram of a computing device that may implement one or more of the localization components shown in FIG. 2.

FIG. 5 is a functional block diagram of a computing device 500 that may implement one or more of the localization components shown in FIG. 2. The following describes one possible basic configuration for the computing device 500. The computing device includes at least a processing unit 502 and memory 504. Depending on the exact configuration and type of computing device, memory 504 may be volatile (such as RAM), non-volatile (such as ROM, flash memory, etc.) or some combination of the two. System memory 504 typically includes an operating system 520, one or more applications 524, and may include program data (not shown). Memory 504 also includes one or more of the localization components 522. This basic configuration is illustrated in FIG. 5 by dashed line 506.

Additionally, computing device 500 may also have other features and functionality. For example, computing device 500 may also include additional storage (removable and/or non-removable) including, but not limited to, magnetic or optical disks or tape. Such additional storage is illustrated in FIG. 5 by removable storage 508 and non-removable storage 510. Computer-readable storage media includes volatile and nonvolatile, removable and non-removable media implemented in any method or technology for storage of information such as computer readable instructions, data structures, program modules or other data. Memory 504, removable storage 508, and non-removable storage 510 are all examples of computer-readable storage media. Computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 500. Any such computer storage media may be part of computing device 500.

Computing device 500 may also include one or more communication connections 516 that allow the computing device 500 to communicate with one or more computers and/or applications 518. As discussed above, communication connections may be utilized to offload processing from the computing device to one or more remote computers. Device 500 may also have input device(s) 512 such as keyboard, mouse, pen, voice input device, touch input device, etc. Output device(s) 512 such as a speaker, printer, monitor, and other types of digital display devices may also be included. These devices are well known in the art and need not be discussed at length here.

The processes described above may be implemented using computer-executable instructions in software or firmware, but may also be implemented in other ways, such as with programmable logic, electronic circuitry, or the like. In some alternative embodiments, certain of the operations may even be performed with limited human intervention. Moreover, the process is not to be interpreted as exclusive of other embodiments, but rather is provided as illustrative only.

It is envisioned that the present localization system may be utilized in several environments. For example, the localization system may be provided as a service to businesses. The localization system may send images that were captured near a business to the business. The business could then manually review the images and identify the images in which the business appears. The localization system may then utilize those identified images to determine a precise location for the business. In this example, the pattern matching step is performed manually by the business. This and other implementations are envisioned.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-readable media having computer-executable instructions that when executed, perform a method comprising:
   obtaining an entity from a first database, the entity being associated with an address and a visual feature that is viewable at street level;
   identifying, from a set of street level images that are each associated with respective positional data, a subset of the street level images captured in proximity to the address of the obtained entity;
   analyzing each street level image in the identified subset to determine whether the visual feature appears in that street level image; and
   determining a precise location for the entity based on a number of street level images in which the visual feature appears.

2. The computer-readable media recited in claim 1, wherein the number equals one and determining the precise location for the address is based on the positional data associated with the one matched street level image.

3. The computer-readable media recited in claim 1, wherein the number equals more than one and determining the precise location for the address includes triangulation using at least two of the street level images in which the visual feature appeared to identify the precise location.

4. The computer-readable media recited in claim 1, wherein the number equals zero and determining the precise location for the address includes interpolation using at least one previously determined precise location for another entity with a nearby address.

5. The computer-readable media recited in claim 1, wherein locating the set of street level images includes searching an image database in which the set of street level images are organized by associated positional data.

6. The computer-readable media recited in claim 1, further comprising storing the precise location in a second database.

7. The computer-readable media recited in claim 6, further comprising storing a matched street level image in the second database in association with the precise location for the address, the matched street level image being one of the street level images in which the visual feature appears.

8. The computer-readable media recited in claim 7, further comprising displaying a symbol on a computer-generated map, the symbol representing the precise location for the address.

9. The computer-readable media recited in claim 8, further comprising displaying the matched street level image in conjunction with the computer-generated map.

10. The computer-readable media recited in claim 1, wherein the first database comprises a yellow page directory.

11. The computer-readable media recited in claim 1, wherein the visual feature comprises a logo.

12. The computer-readable media recited in claim 1, wherein the visual feature comprises a sign.

13. The computer-readable media recited in claim 1, wherein the visual feature comprises a house number plate.

14. A computer readable storage medium storing a computer-implemented mapping application comprising:
obtaining a precise location for an entity, the precise location being derived by
obtaining, from a first database, an entity associated with an address and a visual feature that is viewable at street level,
analyzing each one of a set of street level images captured near the address associated with the obtained entity to determine whether the visual feature appears in that street level image, each street level image associated with respective positional data, and
determining the precise location based on the positional data of each street level image identified in the analyzing; and
placing a symbol on a computer-generated map based on the precise location for the entity.

15. The computer-implemented mapping application recited in claim 14, wherein at least one of the street level images displays a visual feature associated with the entity.

16. The computer-implemented mapping application recited in claim 14, wherein the precise location for the entity is retrieved from a database.

17. The computer-implemented mapping application recited in claim 14, wherein the precise location for the entity is determined in response to a request to map the address.

18. A computer-implemented method comprising:
ascertaining whether a visual feature is present within a street level image, the visual feature including a feature that is viewable at street level, the street level image being associated with positional data that identifies a location where the street level image was captured; and
determining, after the ascertaining, a precise location for an entity associated with the visual feature based on the positional data, when the visual feature is determined to be present within the street level image.

19. The computer-implemented method recited in claim 18, wherein determining the precise location comprises calculating a distance from the location where the street level image was captured to the entity and adding the distance to the positional data.

20. The computer-implemented method recited in claim 18, wherein the positional data comprises a geographic coordinates obtained via a global positioning device.

* * * * *